United States Patent [19]

Segawa

[11] 4,320,672
[45] Mar. 23, 1982

[54] INTER HOUSING SPEED TRANSMISSION HUB FOR BICYCLES

[75] Inventor: Takashi Segawa, Sakai, Japan

[73] Assignee: Shimano Industrial Company, Limited, Osaka, Japan

[21] Appl. No.: 100,160

[22] Filed: Dec. 4, 1979

Related U.S. Application Data

[63] Continuation of Ser. No. 366,511, Jun. 4, 1973, abandoned.

[30] Foreign Application Priority Data

Feb. 5, 1973 [JP] Japan .................. 48-14960

[51] Int. Cl.³ .................. F16H 3/44; B60K 41/26
[52] U.S. Cl. .................. 74/750 B; 74/781 B; 192/6 A
[58] Field of Search .............. 74/752 B, 781 B, 750 B, 74/763; 192/6 A

[56] References Cited

U.S. PATENT DOCUMENTS

| | | | |
|---|---|---|---|
| 2,530,646 | 11/1950 | Brown | 74/763 |
| 2,865,477 | 12/1958 | Hood | 192/6 A |
| 2,865,478 | 12/1958 | Hood | 74/750 B |
| 3,113,472 | 12/1963 | Schwerdhöfer | 192/6 A |
| 3,215,002 | 11/1965 | Schwerdhöfer | 74/750 B |
| 3,828,627 | 8/1974 | Schwerdhöfer | 74/750 B |
| 3,973,451 | 8/1976 | Kine | 74/750 B |
| 4,147,243 | 4/1979 | Segawa et al. | 192/6 A |
| 4,160,393 | 7/1979 | Fukui | 74/750 B |

FOREIGN PATENT DOCUMENTS 810708 6/1951 Fed. Rep. of Germany .... 74/781 B

Primary Examiner—Allan D. Herrmann
Attorney, Agent, or Firm—Stevens, Davis, Miller & Mosher

[57] ABSTRACT

An independent unit including a multi-speed transmission mechanism and a driving device both assembled on a main fixed shaft of a bicycle in detachably mountable relation with respect to a hub shell for receiving the unit thereby making it very easy to repair any damaged portion of the mechanism and the device merely by exchanging the unit for a new one.

Also disclosed is a similar unit comprising a brake shoe and a brake cone integrally formed in detachably mountable relation with respect to a hub shell adapted for a coaster brake type multi-speed transmission hub.

4 Claims, 7 Drawing Figures

INTER HOUSING SPEED TRANSMISSION HUB FOR BICYCLES

This is a continuation of application Ser. No. 366,511 filed June 4, 1973 now abandoned.

The present invention relates generally to improvements in an interhousing speed transmission hub for bicycles, and more particularly to such bicycle hub of the type in which there is provided a multi-speed transmission mechanism adapted to be operated from the outside so as to transmit a driving force from a driving means to a hub shell at a desired speed ratio thereby relating a bicycle wheel through spokes at said speed ratio.

Referring to most of the conventional inter housing speed transmission hub means for bicycles, they are composed mainly of a fixed main shaft rigidly mounted to a bicycle frame member, a driving means rotatably supported on the fixed main shaft, and a multi-speed transmission mechanism adapted to transmit the driving force of the driving means directly to a hub shell on transmit thereto said force selectively at an accelerated or reduced speed ratio.

According to these hub means, the construction is such that a control means mounted internally of said multi-speed transmission mechanism is operated from the outside so as to select the course through which said force of the driving means is transmitted to the hub shell thereby causing a bicycle wheel to rotate at a particularly selected speed ratio.

Referring further to the conventional coaster brake type speed transmission hub means having a control means internally housed in a hub shell, they are provided internally of said hub shell, with a driving means, a multi-speed transmission mechanism, a control frame mounted in axially movable relation with the reversion of a pedal means, brake cones rigidly fixed to said bicycle frame member in opposed relation to said control frame, and brake shoes adapted to be pressed against the inner surface area of the hub shell when the control frame moves thereby enabling a cyclist to stop the rotation of the hub shell on the wheel merely by driving the hub shell at a changed speed ratio and reversely treading the pedal means.

Any of the above-mentioned speed transmission hub means internally provided with said multi-speed transmitting mechanism is formed, however, with many complicated structural elements including a gear frame having planet gears, ring gears, a gear framing therefor and a driving force transmitting panel members mounted to said ring gear. Thus in order to assemble or disassemble this mechanism with respect to the hub shell, it is necessary to mount or dismount one element after another systematically in order for the elements to be disassembled or assembled.

Similarly, the conventional multi-speed transmission hub means having a coaster brake is constructed internally of a bicycle hub shell so that each mechanically elemental part of said coaster brake can be independently mounted into or dismounted from said hub shell.

As is clearly understood from the foregoing, all the conventional type inter housing multi-speed transmission hub means are so difficult to assemble that they naturally cause a decrease in the work efficiency, with such an additional disadvantage, for example, that if a cyclist who runs a bicycle having said hub mechanism happens to find that a driving force transmitting pawl member or brake blocks are worn out, or that the driving force transmitting mechanism is out of order, he must take then out of a hub shell with much painstaking effort before he can repair them or exchange the same for new corresponding ones.

Referring more in detail to the construction of the conventional multi-speed transmission hub by way of example of a three speed transmission hub in accordance with the present invention, said hub comprises a gear frame having planet gears, a control means and a ring gear being inserted into a fixed main shaft, said shaft being then inserted into a hub shell so cautiously that all of these mechanical elements should not be disengaged from said shaft, low and intermediate speed transmitting pawl members adapted to mesh with a ratchet of the hub shell, a ball holder tightly fixed by means of a locknut to a screw disposed at the left hand side of the fixed main shaft, a cylindrical fixture screwed to the right hand side of the hub shell, and a driving means inserted into the hub shell, said ball holder being screwed to a screw disposed at the right hand side of the fixed main shaft and tightly fixed to said screw by means of a suitable locknut.

In case of assembling said hub means, all the above-mentioned mechanically elemental parts are inserted one after another in the order in which they have been referred to hereinabove, and in case of disassembling the same, all the parts are pulled out one after another in the reverse order.

Accordingly, the present invention has been designed to eliminate all the above-mentioned drawbacks and disadvantages and has as one of its main objects the provision of an inter housing multi-speed transmission hub detachably constructed so that a multi-speed transmitting mechanism and a driving means are not only easily mountable in the inside of a hub shell but also removable therefrom as occasion arises.

It is another object of the invention to provide such an inter housing multi-speed transmission hub that even if a breakdown takes place to a driving force transmitting pawl member or any other elemental parts of the hub, the broken parts can be easily repaired or exchanged for new ones without moving the hub shell from a bicycle wheel.

It is a further object of the invention to provide an inter housing multi-speed transmission hub which comprises a fixed main shaft, a driving means and other mechanical elements of the hub formed into a single unit so that even if a breakdown takes place to any of them while the time is extremely limited for repair, the hub can be completely repaired in a very short length of time merely by exchanging a broken part unit for a new one.

It is a still further object of the invention to provide an inter housing coaster brake type multi-speed transmission hub so constructed that it is quite easy to assemble a brake within the hub and also pull out an assembled brake from the hub as occasion arises.

While the features with the present invention will be clearly evident from some preferred embodiments of the invention illustrated in the accompanying drawings, the broad outline of the invention is such that both a driving means and a multi-speed transmitting mechanism forming an indispensable part of the hub in accordance with the present invention can be assembled with a fixed main shaft in a manner to provide a unit of speed transmitting elements which it is possible not only to insert into a hub shell but also to pull out therefrom through a single operation, that once inserted, said unit can be fixedly held in the inside of the hub shell by means of a locknut, and further that a brake cone and a brake shoe engaged with one another in a manner to form a unit of brake elements whereby the latter unit, similarly to said unit of speed transmitting elements, can be detachably mounted to the hub shell.

For a fuller understanding, the inter housing speed transmission hub of the invention is assembled with a bicycle wheel to form an integral part thereof by fixedly connecting the hub shell and a rim through a plurality of spokes, and in this case, a fixed main shaft remains ready to be pulled out from the hub shell. Thus in this invention, use is made of this fixed main shaft to assemble therewith a speed transmission mechanism and a driving means to thereby provide a single unit of speed transmitting element which is detachably mountable in the hub shell; and further use is made of said fixed main shaft to provide an improved coaster brake type speed transmission hub by forming speed transmitting elements and a single unit of braking elements which are both detachably mountable in the hub shell.

These and other objects, features and advantages of the present invention will become apparent from the following detailed description when taken in conjunction with the accompanying drawings showing, by way of example, an inter housing three speed transmission hub provided with a higher, intermediate and lower speed transmission mechanism housed in the inside of a hub shell, in which;

FIG. 5 is a cutaway front view thereof;

FIG. 6 is a cross-sectional view taken in the line of VI—VI of FIG. 5; and

FIG. 7 is a front elevation view showing the relation between a driving means and an actuating means.

Figure 1:
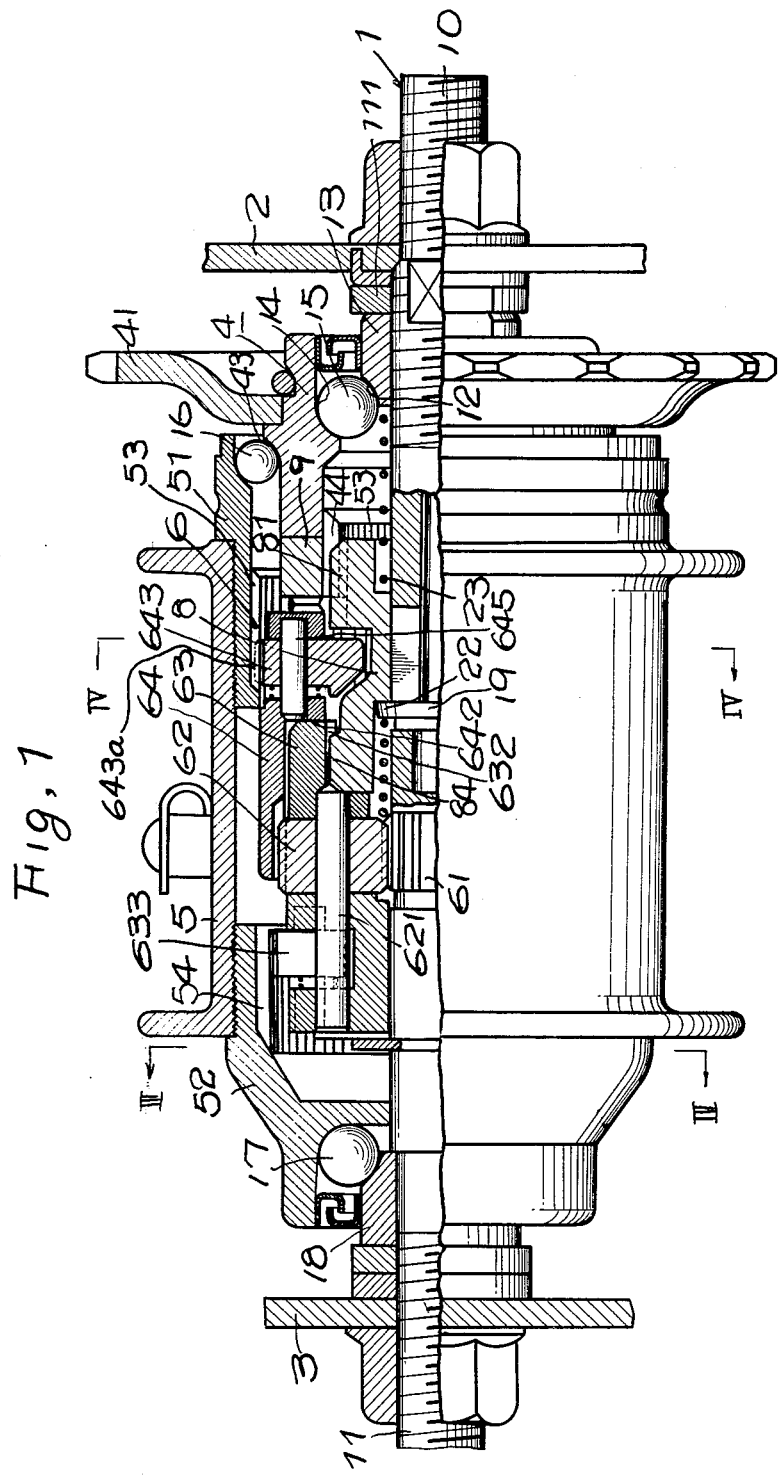
FIG. 1 is a cutaway front view of the hub in accordance with the invention.

Referring now to some preferred embodiments of the invention with respect to the accompanying drawings, and first more particularly to FIG. 1, the reference numeral 1 designates a fixed main shaft generally supported by means of bicycle frame members 2 and 3. To said fixed main shaft 1 is rotatably mounted a driving means 4 at a properly spaced apart interval. A hub shell 5 is mounted to said driving means 4 in rotatable relation therewith. A speed transmitting mechanism 6 is housed in the inside of the hub shell 5 so as to change a driving force from the driving means 4 into a desired speed and transmit it to the hub shell 5. Between the driving means 4 and the speed transmitting mechanism 6 there is mounted a control means 8 adapted to controllably relay the driving force of the driving means 4 to the mechanism 6.

In this embodiment, a pair of screws 10, 11 are formed on the outer peripheries of both ends of said fixed main shaft 1, and a ball holder 13 having a ball receiving surface 12 is screwably engaged with said screw 10.

Meanwhile, a ball 15 is inserted between said ball receiving surface 12 and another ball receiving surface 14 formed on the inner wall of said driving means 4 so that the driving means 4 is rotatably supported on the fixed main shaft 1 at a properly spaced apart interval.

At the right hand side of the driving means 4 there is rigidly fixed a sprocket wheel 41 adapted to be engaged with a driving chain (not shown in the drawings) thereby making it possible for a cyclist to forcibly actuate the driving means 4 by pedalling a bicycle.

Further on the outer periphery of the driving means 4 there is formed a ball receiving surface 43 so that the driving means 4 is rotatable relative to a cylindrical fixture 51 rigidly fixed through a ball 16 to the right hand side of the hub shell 5.

Likewise, another cylindrical fixture 52 is rigidly fixed to the left hand side of the hub shell 5, and a further ball 17 is held between said cylindrical fixture 52 and a ball receiving surface 18 insertibly mounted onto the left hand side of the fixed main shaft whereby the ball 17 is rotatably supported with respect to the fixed main shaft 1.

The control means 8 adapted to relay the driving force to the speed transmitting mechanism 6 and at the same time control this force is insertibly mounted to the fixed main shaft 1 in rotatable and movable relation thereto. Intermediate of the control means 8 there is formed an annular groove portion 82 and an annular prominence 83 having a tapering guide surface. At the right hand side of said annular groove portion 82 there are mounted teeth 81 for intermeshing with inner surface teeth 44 of the driving means 4 while at the left hand side of said annular prominence 83 there are mounted teeth 84 which are intermeshed with the inner surface teeth of a gear frame to be described hereinafter.

The control means 8 is adapted to move along the fixed main shaft 1 by the operation of a push rod 20 which is provided with a gear shifting key 19 and inserted into inner hollow portion 1a of the fixed main shaft 1 so that when intermeshed with said inner surface teeth 44 of the driving means 4, said control means 8 is moved to transmit the driving force to the speed transmitting mechanism 6.

Incidentally, said gear shifting key 19 has its portion projected outwardly of the fixed main shaft 1 from a longitudinal hole 21 which is communicated with said inner hollow portion 1a of the shaft 1 so as to form a projection 22 which is interlocked with the control means 8.

In order to maintain the interlocked relation of the projection 22 with the control means 8, a suitable coil spring 23 is held between the control means 8 and the ball holder 13 thereby to normally press the means 8 against the projection 22. This has a result that the control means 8 is movable back and forth in the axial direction by operating the push rod 20.

Next, reference will be made to the speed transmitting mechanism 6 housed internally of the hub shell 5. Said mechanism 6 comprises a sun gear 61, a plurality of planet gears 62 intermeshed therewith, a gear frame 63 for supporting said gear 62 by means of an axis 621, a ring gear 64 having an inner surface tooth 641 intermeshed with said planet gears 62, and said ring gear 64 having a notched portion 642 contactable with the right hand side of said gear frame 63.

In the inner surface of the right hand side of side gear frame 63 said speed transmitting mechanism 6 has inner teeth 632 engageable with teeth 84 disposed at the left hand side of said control means 8. At the left hand side of the gear frame 63, there are mounted a plurality of intermediate and low speed transmitting pawl members 633 in a manner that the foremost ends of these members are readily engageable with a ratchet 54 formed internally of the cylindrical fixture 52.

Close to the right hand side of said ring gear 64, a plurality of high speed transmitting pawl members 643 are held by a spring 643a on an axis 645 such that the foremost ends of the members 643 are readily engageable with a ratchet 53 mounted in the cylindrical fixture 51, while the rear portion of the member 643 is disposed in correspondence to the annular groove 82 and the annular prominence 83 both formed in the control means 8.

When the driving means 4 rotates in the normal direction, the rotary force thereof is transmitted through the control means 8 to the speed transmitting mechanism 6. However, when it rotates reversely, the the actuating means 9 and the driving means 4 skate on each other, thus permitting the driving means 4 only to rotate (see FIG. 7).

All the above-mentioned structural elements of the speed transmitting mechanism 6 are provided internally of the conventional type speed transmission hub.

Figure 2:
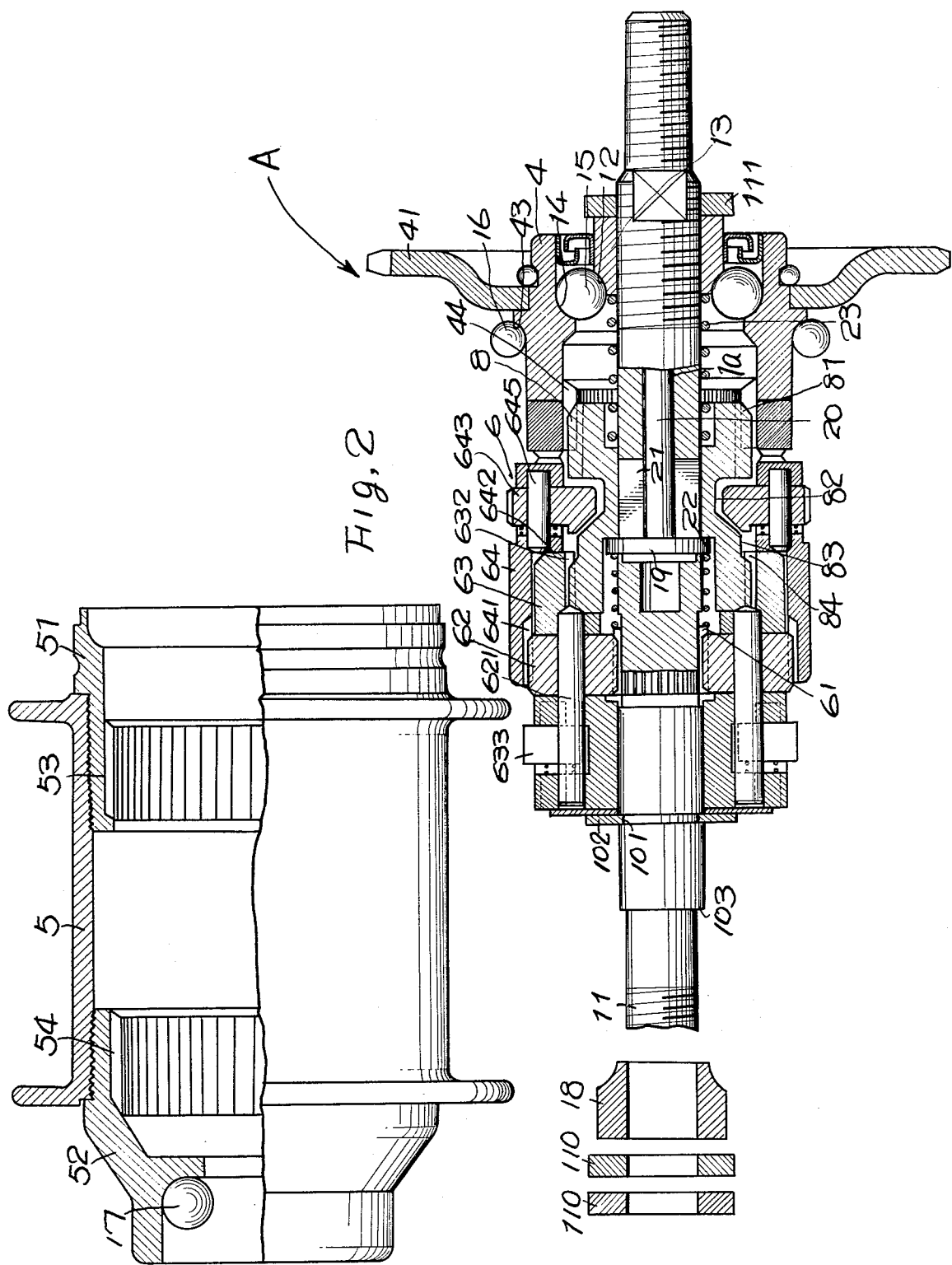
FIG. 2 is an exploded view thereof prior to being assembled.
Figure 3:
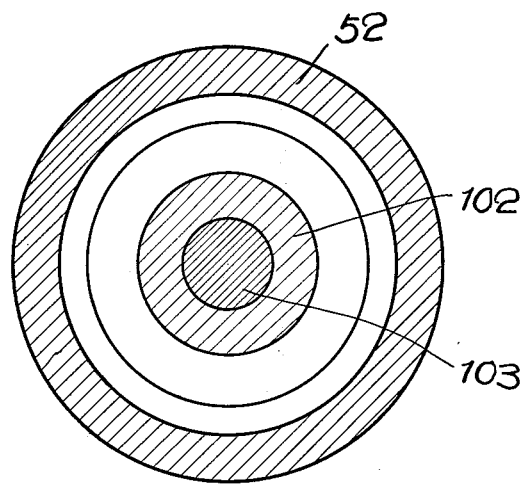
FIG. 3 is a cross-sectional view thereof taken in the line III—III of FIG. 1.
Figure 4:
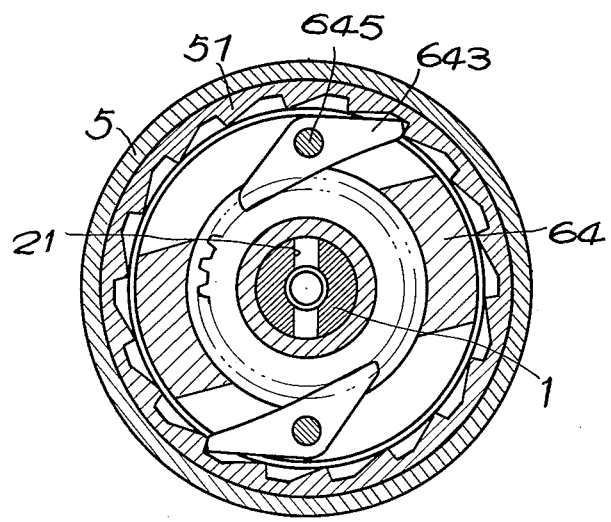
FIG. 4 is likewise a cross-sectioned view showing the hub taken in the line of IV—IV of FIG. 1.

Thus according to the present invention, these structural elements are assembled to form such a single speed transmission unit A, for example, as shown in FIG. 2 of the accompanying drawings so that said unit A is not only detachably inserted into the hub shell 5 but also rigidly fixed thereto by means of a locknut 110.

Incidentally, the numeral 111 denotes a locknut for rigidly fixing the aforesaid ball holder 13.

In the following, reference will be made in detail to the above-mentioned speed transmission unit A.

As is clearly evident in FIG. 2, said unit A comprises the fixed main shaft 1, the speed transmitting mechanism 6, the driving means 4 and the control means 8. For a fuller understanding, the left hand-side portion of the fixed main shaft 1 is formed with an annular groove 101 to which is mounted an annular stopper 102 thereby to control the axial movement of said gear frame 63. Said gear frame is previously inserted onto the fixed main shaft 1 so as to be held in the position where the gear frame abuts against said stopper 102. Incidentally, in this position said plurality of planet gears 62 are engaged with the sun gear 61.

Next, the control means 8 and the ring gear 64 are inserted into the fixed main shaft 1 to engage the teeth 84 of the control means 8 with the inner teeth 632 of the gear frame 63, thereafter engaging the inner teeth 641 of the ring gear 64 with said planet gears 62; then the rear portion of the high speed transmitting pawl member 643 is disposed in a position corresponding to the annular groove 82 of the control means 8. Further, a spring 23 is inserted onto the fixed main shaft 1, thereafter the driving means 4 is also inserted therein in a manner that the inner teeth 44 thereof are engaged with the teeth 81 of the control means 8. Then, the ball 15 is inserted onto the fixed main shaft 1 and finally the ball holder 13 is screwably mounted thereto.

In the above-mentioned construction of the speed transmission unit A, what are rigidly fixed to the fixed main shaft 1 are said ball holder 13 and said stopper 102, the latter being disposed most outwardly of the unit A. Between the ball holder 13 and the stopper 102, all the other structural elements of the unit A are held so as to effect their respective functions.

The positional relation of the unit A, as the whole, is such that it can be adjusted by screwably forcing the ball holder 13 into said stopper 102, and inseparably held in the adjusted position. In this case, the gear frame 63 is securedly held by means of the stopper in the axial direction where it is disposed, and by means of said gear frame 63 the ring gear 64 is held through the recessed portion 642, with the driving means 4 supported by means of this ring gear 64. In this connection, the ball 16 is previously inserted into the ball receiving pocket 43 of the driving means 4.

The unit A thus constructed is detachably inserted into the hub shell 5 to form an integral part of the speed transmission hub of the present invention; in this case, the outer diameter of the ring gear 64 positioned outwardly with respect to the periphery of the hub shell 5 is particularly made smaller than the inner diameter of the cylindrical fixture 51 screwably engaged with the hub shell 5 so that the unit A can be inserted without difficulty into the hub shell from the outside of the cylindrical fixture 51.

Referring now to the process through which the above-mentioned unit A is assembled integrally with the hub shell 5, the left hand-sided screw portion 11 of the fixed main shaft 1 is inserted into the hub shell 5 from the cylindrical fixture portion 51 disposed on the right hand side of the hub shell so as to house the unit A into the hub shell; then the ball holder 18 is mounted into the hub shell and the locknut 110 is screwably engaged with the same thereby rigidly fixing the unit A to the hub shell 5.

Incidentally, said ball holder 18 may be mounted to the fixed main shaft 1 by means of a spline (not shown in the accompanying drawings). Preferably, the fixed main shaft 1 is provided with a recessed portion 103 so as to determine a desired position of the ball holder 18 thereby orienting the unit A with respect to the hub shell 5.

Figure 5:
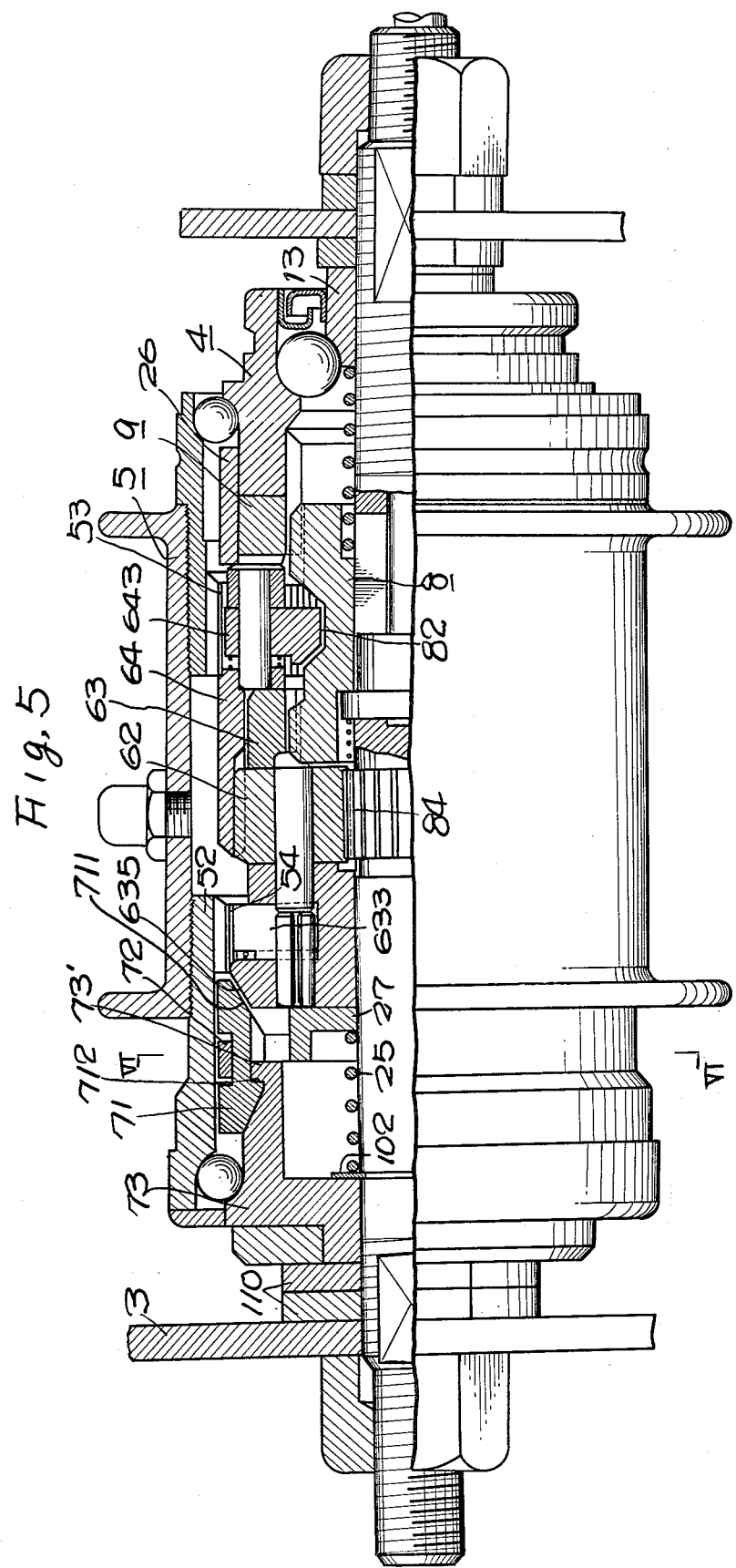
FIGS. 5 through 7 illustrate an inter housing multi-speed transmission hub provided with a coaster brake, in which especially
Figure 6:
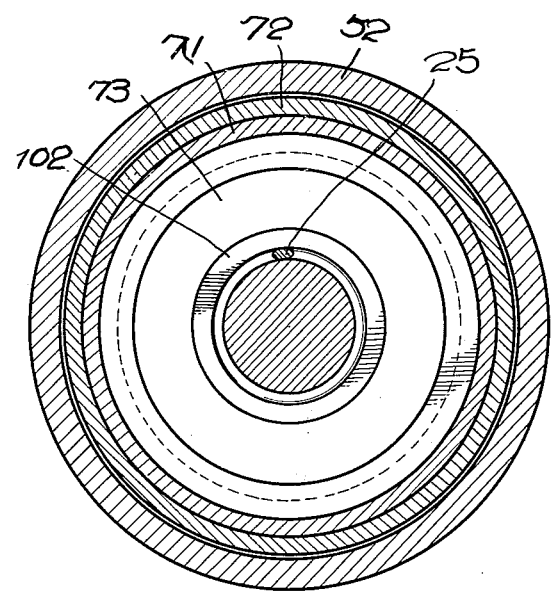
Figure 7:
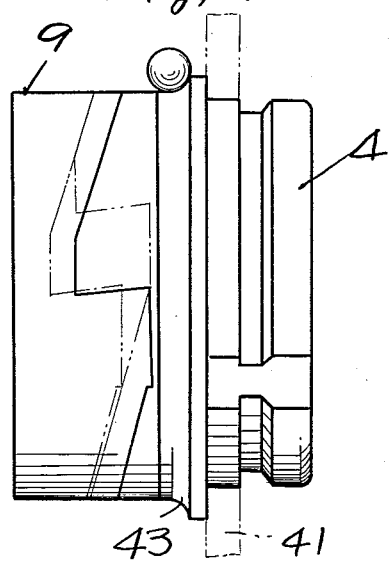

Next referring to the process through which the unit A is assembled integrally with the hub shell 5 provided with the coaster brake as shown in FIG. 5, a tapering surface area 635 is formed on the left hand-sided outer periphery of the gear frame 63, and an actuating means 9 as shown in FIG. 7 is mounted between the driving means 4 and the ring gear 64 thereby to form a cam between said actuating means 9 and the driving means 4 so that when the driving means is rotated reversely by treading the pedals in the reverse direction, the actuating means is pressed out in the axial direction to move the ring gear 64 and the gear frame 63 axially of the fixed main shaft 1.

In the second instance, there is provided a brake shoe 71 which has a tapering surface area 711 corresponding to said tapering surface area 635 of the gear frame 63 and is liable to come close to the axis of the fixed main shaft 1 under the influence of a ring spring 72; said brake shoe 71 is supported by means of a brake cone 73 rigidly fixed to the bicycle frame member 3.

The foremost outer periphery of the brake cone 73 is provided with a projection 73' extending outwardly of said periphery in a manner to be engageable with a recessed portion 712 formed in the inner surface of the brake shoe 71 so that when the brake cone 73 is moved outwardly of the axis thereof or in the direction where it is to be taken off the hub shell 5, it can go together with the brake shoe 71, and when the brake cone 73 is to be taken off, the brake shoe 71 is also taken off.

When the driving means 4 is forced to rotate reversely by treading the pedals in the reverse direction, the actuating means 9 is pressed out to the left hand side of the axis to move the ring gear 64 and the gear frame 63 together therewith. Thus, the tapering surface area 635 of the gear frame 63 is brought into contact with the similar tapering surface area 711 of the brake shoe 71 to forcibly expand the brake shoe 71 radially and outwardly thereof against the ring or plate spring 72, the result being that the outer peripheral surface of the brake shoe 71 is frictionally contacted with the inner peripheral surface of the cylindrical fixture 52 to control the hub shell 5.

As has been mentioned above, the brake shoe 71 is adapted to contact the brake cone 73 rigidly fixed to the bicycle frame member 3 so that when the former contacts the brake cone 73, it is prevented from rotating and at the same time urged to slide into contact with the cylindrical fixture 52.

Incidentally, the numeral 25 in FIG. 5 of the accompanying drawings denotes a return spring mounted between the left hand side of the gear frame 63 and the aforesaid stopper 102 so as to prevent the ring gear 64 and the gear frame 63 from being unexpectedly rotated in the forward direction. Preferably the spring 25 has a greater resiliency than that of the spring 23 for the control means 8. A cylindrical body 26 is sleeved close to the outer periphery of the acutating means 9 in order to effect the normal operation of the actuating means 9.

Said return spring 25 is preferably so provided that it cannot directly contact the gear frame 63 but can contact the same through a single receiving plate 27 rigidly fixed to the gear frame 63 or likewise through a pair of receiving plates rotatably mounted, for example, by means of a ball bearing thereby preventing the rotation of the gear frame 63 from being transmitted to the return spring 25.

Apart from the above-mentioned jointing construction of the driving means 4 and the actuating means 9, any suitable screws may be employed for the purpose of fabricating these means in integral relation with one another.

According to the coaster brake type inter housing multi-speed transmission hub of the present embodiment, the unit A is detachably mounted to the hub shell 5 so as to be insertibly mountable and dismountable with respect thereto. This is also the case with the coaster brake. Namely, the brake cone 73 and the brake shoe 71 are engageable with one another so that the unit A can be easily inserted into the hub shell 5 or removed therefrom, thus making it possible for a cyclist to repair a frictionally worn brake shoe or exchange the same for a new one conveniently is a very short length of time.

The working of the above-mentioned hub is substantially the same as that of the conventional ones as shown in FIG. 1, in which there is illustrated the driving means 4 whose rotation is increased and transmitted to the hub shell 5. In this case, the control means 8 is located in the extreme left hand side of the hub shell 5 and the teeth 84 of the control means 8 are engaged with the inner teeth 632 of the gear frame 63 so that the driving force from the control means 8 is transmitted to the speed transmitting mechanism through the gear frame 63.

Thus if in this case the driving means 4 is rotated in the forward direction through a sprocket wheel 41, the hub shell 5 will be rotated at the high speed rate through a driving force transmitting course consisting of the driving means 4, the control means 8, the gear frame 63, planet gears 62, ring gears 64, the high speed transmitting pawl member 643, the ratchet 53 and the cylindrical fixture 51.

In this case, the intermediate and low speed transmitting pawl member 633 and the ratchet 54 are in engaged relation with one another. However, the ratchet 54 will slide on the pawl member 633 since the hub shell 5 is rotating at a higher speed than this pawl member 633.

Referring now additionally to the gear-shifting operation from the high speed to the intermediate, the push rod 20 is forced to the right and then the rear end portion of the high speed transmitting pawl member 643 which was located at the annular groove 82 and engaged with the ratchet 53 is held up from the guide surface thereof to the annular prominence 83 thereby disengaging the foremost end of the pawl member 643 from the ratchet 53.

Accordingly, the driving force of the driving means 4 causes the hub shell 5 to rotate at the intermediate speed through a driving force transmitting course consisting of the control means 8, the gear frame 63, the intermediate and low speed transmitting pawl member 633, the ratchet 54 and the cylindrical fixture 52.

Furthermore when the engaged relation is disconnected between the teeth 84 locating in the left extremity of the control means 8 and the inner teeth 632 of the gear frame 63 while the high speed transmitting pawl member 643 is disengaged from the ratchet 53 by moving the push rod 20 forwardly to the right so as to move the control means 8 to the extreme right hand side thereof, the driving force transmitted to the control means is further transmitted to the cyliydrical fixture 52 through said pawl member 643, the ring gear 64, planet gears 62, the intermediate and low speed transmitting pawl member 633 and the ratchet 54, the result being that the hub shell 5 is caused to rotate at the low speed rate.

Thus according to the present invention, it is understood that the driving means and the structurally complicated speed transmitting mechanism can be easily mounted in the hub shell or dismounted therefrom merely by operating the locknuts to insert the fixed main shaft into the hub shell 5 or pull it out therefrom.

From this it follows that each of the mechanically elemental units fabricated in the above-mentioned manner is adapted to be insertible into the hub shell of a bicycle wheel or dismountable therefrom as occasion arises so that even if wear is caused, for example, to a particular portion of a driving force transmitting pawl member or any other mechanically elemental parts of the hub of the present invention, such particular portion or parts can be conveniently repaired or exchanged for a new one.

Furthermore, the driving means and the speed transmitting mechanism forming part of the hub are fabricated integrally on the fixed main shaft to form a single unit, thus bringing about an additional advantage that any part or parts of these means and mechanism, even if damaged, can be promptly repaired by exchanging said unit for a new one.

The same advantages and merits in use as mentioned above also can of course be obtained by the inter housing multi-speed transmission hub provided with the coaster brake which is also formed to be detachably mounted in accordance with the present invention.

In the foregoing, reference has been made only to the inter housing speed transmission hub of such a type that the transmission of the three speeds, high, intermediate and low is selectively available. However, such is merely one of some preferred embodiments of the invention since various other changes, omissions and additions may be made in the invention without departing from the scope and spirit thereof.

What is claimed is:

1. A speed transmission hub for a bicycle comprising:
   a first unit comprising:
   a hub shell having a substantially cylindrical interior surface having a first ratchet defined therein at one end thereof and a second ratchet defined therein at the other end thereof, said second ratchet being of smaller maximum diameter than the first ratchet;
   means defining a first ball race at the other axial end which is of a diameter less than that of the second ratchet and is axially outward of the second ratchet;
   means defining a second ball race at the one end which is of a diameter greater than that of the first ratchet and is axially outward of the first ratchet;
   a second unit comprising:
   a nonrotatable shaft removably positioned in the center of the hub shell and extending therethrough, said hub shell being rotatably mounted with respect to said shaft;
   a driving means rotatably mounted on said shaft, said driving means normally rotatably supporting said second ball race defining means;
   a multi-speed transmission mechanism removably housed internally of said hub shell and being rotatable about said shaft, said mechanism comprising a first and second plurality of driving force transmitting pawl members engageable respectively with the first and second ratchets, said first pawl members being the radially outwardly farthest extending component of the mechanism within the hub shell; and
   a retaining means for releasably holding said multi-speed transmission mechanism and said driving means in a predetermined axial position on said shaft;
   means for releasably securing said second unit to said first unit with the multi-speed transmission mechanism with the housing; and
   said second unit being readily securable to and releasable from said first unit with the multi-speed transmission mechanism being readily movable, as part of the second unit, into and out of the first unit upon release of said holding means without having to remove said first and second ball race defining means.

2. The speed transmission hub, as set forth in claim 1, wherein said retaining means comprises a stopper rigidly fixed to said shaft positioned within said hub shell and a ball holder screwably engaged with said shaft and rotatably supporting said driving means on said shaft.

3. The speed transmission hub, as set forth in claim 1, wherein said means for holding said speed transmission unit in said hub shell comprises locknuts screwably engaged with said shaft, said locknuts rigidly fixing a ball holder for rotatably supporting said hub shell.

4. The speed transmission hub according to claim 1, wherein said transmission mechanism further comprises:
   (a) a sun gear positioned substantially in the center of said fixed shaft,
   (b) a plurality of planet gears engagable with said sun gear, a gear frame having said first driving force transmitting members, said gear frame being retained in one end axially thereof by means of said retaining means,
   (c) a ring gear having teeth engagable with said planet gears, the middle portion of said ring gear being in abutment with said hub shell and an end of said ring gear axial thereof being in abutment with said driving means thereby to prevent said ring gear from moving in the axial direction, and
   (d) a control means mounted between said gear frame and said driving means so as to move axially of said shaft, said control means being operable by means of a gearshifting key movably mounted along said shaft thereby permitting the driving force from said driving means to be selectively relayed to said ring gear through said gear frame or said second driving force transmitting pawl members.

* * * * *